United States Patent [19]

Breskin

[11] Patent Number: 4,489,844
[45] Date of Patent: Dec. 25, 1984

[54] CREW-TYPE ALL PLASTIC CLOSURE

[75] Inventor: Charles A. Breskin, White Plains, N.Y.

[73] Assignee: Charles A. Breskin Assoc. Inc., Scarsdale, N.Y.

[21] Appl. No.: 449,798

[22] Filed: Dec. 14, 1982

[51] Int. Cl.³ .......................... B65D 41/04; B28B 1/24
[52] U.S. Cl. .................................... 215/329; 215/344; 264/328.8
[58] Field of Search .............. 215/329, 334, 335, 343, 215/344, 345, 350, 352, 354, 246, 341; 264/328.7, 328.8; 425/130

[56] References Cited

U.S. PATENT DOCUMENTS

| | | | |
|---|---|---|---|
| 3,174,641 | 3/1965 | Kitterman | 215/343 X |
| 3,208,649 | 9/1965 | Fields | 215/329 X |
| 3,480,169 | 11/1969 | Hammes | 215/359 X |
| 3,788,510 | 1/1974 | Collins | 215/341 |
| 3,958,910 | 5/1976 | Wilde | 425/127 |
| 3,979,004 | 9/1976 | Bertario | 215/341 |
| 4,088,730 | 5/1978 | Wilde | 264/268 |
| 4,177,905 | 12/1979 | Winchell et al. | 215/246 |
| 4,206,851 | 6/1980 | Ostrowsky | 215/246 |
| 4,275,030 | 6/1981 | Mares | 264/328.7 X |
| 4,308,965 | 1/1982 | Dutt | 215/345 |
| 4,331,249 | 5/1982 | Banich, Sr. | 215/343 |
| 4,335,068 | 6/1982 | Hemery | 264/328.8 X |
| 4,346,812 | 8/1982 | Banich, Sr. | 215/352 |
| 4,366,913 | 1/1983 | Winchell et al. | 215/329 |
| 4,416,602 | 11/1983 | Neumeister | 425/130 |

Primary Examiner—Allan N. Shoap
Assistant Examiner—Bryon Gehman
Attorney, Agent, or Firm—Lawrence Rosen

[57] ABSTRACT

A reusable cap for closing carbonated beverage containers or the like, consists of an internally threaded shell having a fitment therein which sealingly engages the neck of the beverage container at the free edge thereof. The shell and the fitment are constructed of different plastic materials and are injection molded in different portions of the same molding cavity. First, the fitment is formed and then, without moving the fitment from the position in which it was formed, the shell is formed, to produce a unitary structure in which substantial portions of the fitment are imbedded in the shell.

6 Claims, 4 Drawing Figures

CREW-TYPE ALL PLASTIC CLOSURE

This invention relates to reusable closures for beverage containers and the like, and more particularly relates to closures of this type that are constructed entirely of plastic and are usable with both plastic and glass containers.

For many years carbonated beverages and the like have been sold in glass containers having reusable screw-type caps constructed of a metal shell having a paper or composition liner which sealingly engaged the free annular edge at the upper end of the neck defining an opening in the beverage containers. More recently, plastic beverage containers have become popular and while caps with metal shells continue to be used with plastic containers, certain problems have arisen which make it desirable to use all plastic caps with plastic containers.

There are some plastic cap constructions which consist of a single element of homogeneous plastic. However, for the most part plastic caps are constructed of a shell and a liner with the shell being constructed of one type of plastic and the liner being constructed of another type of plastic or of a composition material. Such liners may be separate elements that are inserted into the shell as in U.S. Pat. No. 4,206,851, issued June 10, 1980 to E. M. Ostrowsky for a "Tamperproof Closure", or the liner may be of the flowed-in type as in U.S. Pat. No. 4,331,249, issued Mar. 10, 1981 to J. N. Banich, Sr. for "Plastic Closure Member with Flowed-In Liner" and U.S. Pat. No. 4,346,812 for "Plastic Closure with Reinforced Central Panel", also issued to J. N. Banich, Sr. on Mar. 10, 1981, as well as U.S. Pat. Nos. 3,958,910 and 4,088,730 which issued to Sheldon L. Wilde.

While it appears desirable to utilize all plastic cap constructions, material costs and/or labor costs have been so high as to retard adoption of all-plastic caps. In particular, in the case of caps having separate liners, a separate assembly operation is required to insert the liner into the shell, and in the case of the flowed-in type liner, it is difficult to form the liner with precision and to prevent relative movement between the liner and the shell.

In accordance with the instant invention, the foregoing problems of the prior art are overcome by providing an all-plastic cap that is constructed of a shell of one type of plastic and a sealing fitment of another type of plastic disposed within the shell. Both the shell and fitment are formed in sequence by injection molding in different portions of a single molding cavity, and in a manner such that neither the shell nor the fitment requires handling until the cap is completed. Suitable molding equipment for constructing the cap of the instant invention is disclosed in copending U.S. patent application Ser. No. 305,382, filed Sept. 24, 1981, now U.S. Pat. No. 4,416,602 for "Injection Molding Apparatus for Manufacturing Articles from Different types of Plastic Material". This U.S. application corresponds to the PCT application filed in West Germany on Oct. 2, 1980 and assigned Ser. No. P 30 37 252.2.

Accordingly, the primary object of the instant invention is to provide a novel construction for a beverage container cap including a plastic shell containing a plastic sealing fitment.

Another object is to provide a cap of this type that is effective in preventing leakage of gas under pressure, as well as preventing leakage of liquid.

Still another object is to provide a cap of this type that is relatively inexpensive to construct.

A further object is to provide a cap of this type in which there is a shell and a fitment constructed of different plastic materials and formed in different portions of a single molding cavity.

A further object is to provide a cap of this type that is constructed in a single molding cavity and the final unitary product is formed in this cavity.

These objects as well as other objects of this invention shall become readily apparent after reading the following description of the accompanying drawings in which.

Now referring to the Figures.

Figure 1:
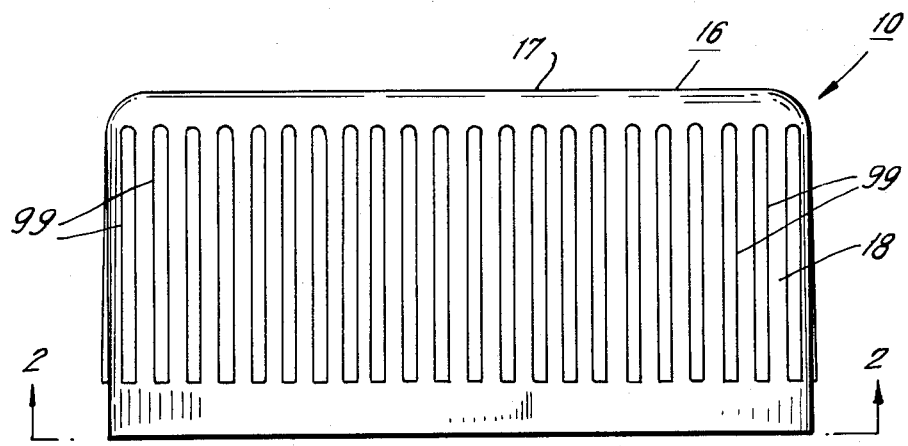
FIG. 1 is a side elevation of a closure cap constructed in accordance with teachings of the instant invention.
Figure 2:
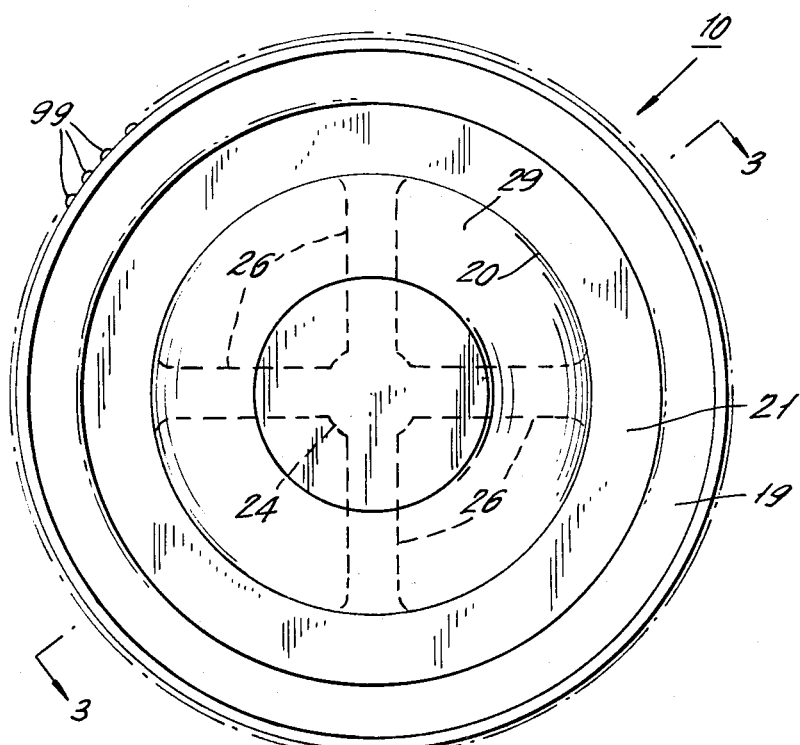
FIG. 2 is a bottom view of the cap looking in the direction of arrows 2—2 of FIG. 1.
Figure 3:
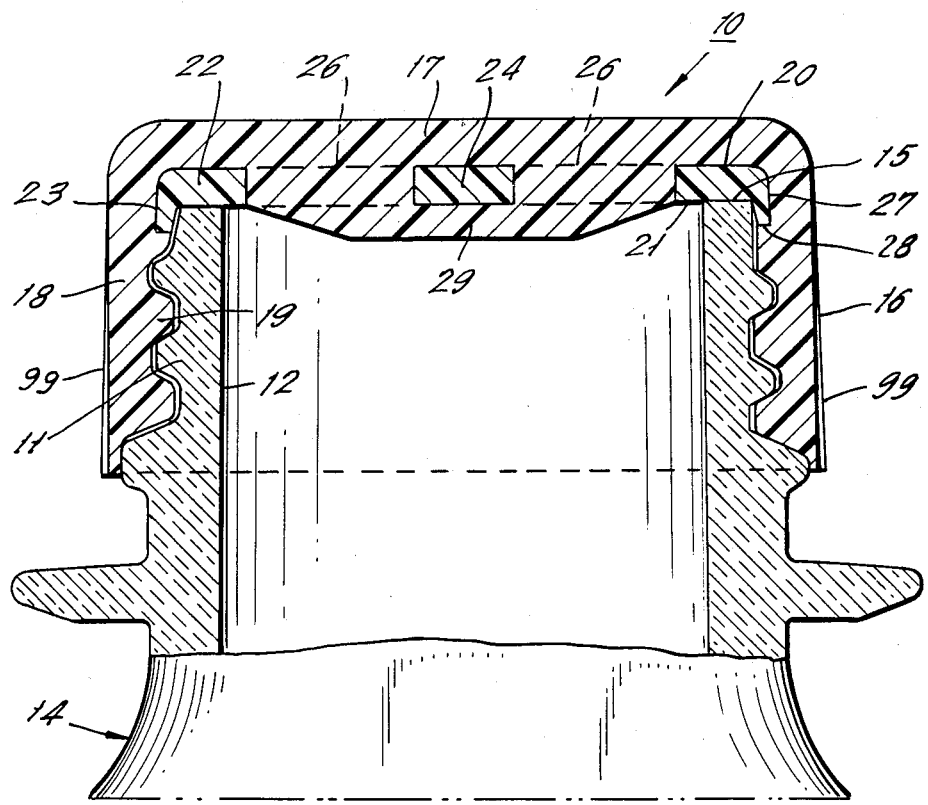
FIG. 3 is a cross-section through line 3—3 of FIG. 2, looking in the direction of arrows 3—3 and showing the cap mounted to a beverage container.
Figure 4:
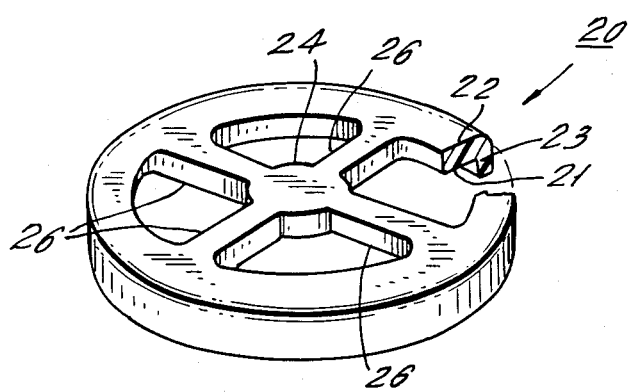
FIG. 4 is a perspective of the fitment constituting the sealing element of the cap.

All-plastic cap 10 is shown in FIG. 3 as being mounted to the external threads 11 on annular neck 12 of beverage container 14.

Cap 10 includes plastic shell 16 consisting of disc-like cover 17 and skirt 18 that depends from the periphery of cover 17. The interior of skirt 18 is provided with threads 19 that cooperatively engage threads 11 to removably secure cap 10 to container 14. A plurality of vertically extending ribs 99 on the outside of skirt 18 facilitate firm gripping of cap 10. Imbedded in shell 16 at the end of skirt 18 connected to cover 17 is plastic fitment 20 having exposed annular surface 21 that sealingly engages free upper edge 15 of container neck 12.

In particular, fitment 20 includes ring 22 and lip 23 depending from the outer edge of ring 22. Hub 24 is concentric with and surrounded by ring 22, being connected thereto by four radially extending and equally spaced spokes 26.

A suitable material for shell 16 is a polypropylene or high density polyethylene. A vinyl is suitable for fitment 20, and it is generally compounded to provide the desired properties of a thermoplastic elastomer. Thus, for example, a blowing agent may be added so that the resultant structure has a cellular construction which will ensure compression, resilience, etc. The fitment may be constructed of a thermoplastic elastomer such as that sold under the trademark KRATON by the Shell Chemical Company.

Suitable apparatus for constructing beverage cap 10 is disclosed in the aforesaid copending U.S. patent application Ser. No. 305,382, filed Sept. 24, 1981. In particular, shell 16 and fitment 20 are injection molded in different portions of a single molding cavity. Preferably, fitment 20 is formed first and while shell 16 is being formed fitment 20 remains fixed in that portion of the cavity where fitment 20 was formed. The finished unitary structure constituting cap 10 removed from the molding cavity was produced without the necessity of intermittent steps requiring movement of fitment 20 or shell 16.

In the final cap 10, hub 24 and spokes 26 are imbedded in the enlarged portion 29 at the interior of cover portion 17. Enlarged portion 29 as well as hub 24 and spokes 26 lend rigidity to shell 16 and assist cover 17 to resist doming. Lower free edge 28 of lip 23 and outer surface 27 of lip 23 are in intimate contact with portions of shell 16 to better control distortion of ring 22 when cap 10 is closed tightly on container 14.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A removable and reusable screw-type cap for a carbonated beverage container or the like having an opening defined by an externally threaded annular neck; said cap comprising a unitary structure including a shell and a fitment; said shell including a disk-like cover portion and an internally threaded skirt portion depending from said cover portion at the periphery thereof; said fitment being disposed within the shell at the end thereof having said cover portion; said fitment having an exposed annular surface portion operatively positioned to engage a container's annular neck at its free end; said fitment and said shell being injection molded of first and second materials, respectively, said materials comprising different plastics or different colors; said fitment includes a ring and a hub surrounded by said ring and a plurality of spokes radiating from said hub and connected to said ring; said exposed annular surface being part of said ring.

2. A removable and reusable screw-type cap as set forth in claim 1 in which the second material is substantially stiffer than said first material and the latter is resiliently deformable to sealingly engage a container's annular neck.

3. A removable and reusable screw-type cap as set forth in claim 2 in which the second material possesses the stiffness and strength properties of a polypropylene or high density polyethylene; said first material having the resilient and deformatior properties of a thermoplastic elastomer.

4. A removable and reusable screw-type cap as set forth in claim 1 in which the hub and spokes are substantially imbedded in portions of said cover portion of the shell.

5. A removable and reusable screw-type cap as set forth in claim 1 in which the fitment and shell are molded in respective first and second portions of a single molding cavity and are combined in said cavity as a unitary structure; said fitment being formed before the shell is formed, and portions of the fitment being imbedded in said shell; said fitment remaining in said first portion of said cavity while said shell is being formed.

6. A removable and reusable screw-type cap as set forth in claim 1 in which said shell and said fitment are differently colored.

* * * * *